(12) United States Patent
Khaddam

(10) Patent No.: US 8,295,167 B2
(45) Date of Patent: Oct. 23, 2012

(54) MITIGATING NETWORK IMPAIRMENTS

(75) Inventor: Mazen Khaddam, Cumming, GA (US)

(73) Assignee: Cox Communications, Inc., Atlanta, GA (US)

( * ) Notice: Subject to any disclaimer, the term of this patent is extended or adjusted under 35 U.S.C. 154(b) by 234 days.

(21) Appl. No.: 12/390,729

(22) Filed: Feb. 23, 2009

(65) Prior Publication Data

US 2010/0214912 A1 Aug. 26, 2010

(51) Int. Cl.
*G06F 11/00* (2006.01)
(52) U.S. Cl. ............ 370/230; 370/237; 370/395.52; 370/447; 709/239; 379/221.01
(58) Field of Classification Search ......... 370/395.21, 370/392, 221, 437, 442, 356, 445, 230, 237, 370/447–448, 389, 351, 493; 375/240.26; 709/239; 379/221.01
See application file for complete search history.

(56) References Cited

U.S. PATENT DOCUMENTS

| | | | | | |
|---|---|---|---|---|---|
| 4,658,396 | A | * | 4/1987 | Barden | 370/221 |
| 5,963,560 | A | * | 10/1999 | Kalkunte | 370/448 |
| 5,978,383 | A | * | 11/1999 | Molle | 370/445 |
| 6,101,194 | A | * | 8/2000 | Annapareddy et al. | 370/447 |
| 6,611,529 | B1 | * | 8/2003 | Krishnakumar et al. | 370/437 |
| 6,751,231 | B2 | * | 6/2004 | Fellman et al. | 370/437 |
| 7,701,951 | B2 | * | 4/2010 | Chapman et al. | 370/395.52 |
| 7,706,281 | B2 | * | 4/2010 | Dalal et al. | 370/237 |
| 2001/0048692 | A1 | * | 12/2001 | Karner | 370/442 |
| 2003/0198245 | A1 | * | 10/2003 | Bradford et al. | 370/445 |
| 2006/0146862 | A1 | * | 7/2006 | Lee | 370/448 |
| 2006/0187916 | A1 | * | 8/2006 | Vasseur et al. | 370/389 |
| 2006/0262772 | A1 | * | 11/2006 | Guichard et al. | 370/351 |
| 2008/0089355 | A1 | * | 4/2008 | Lo et al. | 370/448 |
| 2008/0107128 | A1 | * | 5/2008 | Lo et al. | 370/448 |
| 2008/0107218 | A1 | * | 5/2008 | Geissler et al. | 375/356 |
| 2008/0225850 | A1 | * | 9/2008 | Oran et al. | 370/392 |
| 2009/0034627 | A1 | * | 2/2009 | Rodriguez et al. | 375/240.26 |
| 2009/0086706 | A1 | * | 4/2009 | Huang et al. | 370/349 |

* cited by examiner

*Primary Examiner* — Michael Thier
*Assistant Examiner* — Vincelas Louis
(74) *Attorney, Agent, or Firm* — Merchant & Gould

(57) ABSTRACT

An edge device for controlling provisioning of data streams to a network includes a primary channel for receiving a primary stream and a secondary channel for receiving a secondary stream. A scheduler selects between the primary stream and the secondary stream. Timers quantify an elapsed time between a triggering event and a previous switch by the scheduler from the secondary stream to the primary stream and quantify a wait time. When the primary stream does not meet the predetermined criteria and the secondary stream does meet the predetermined criteria, the scheduler switches to the secondary stream. The scheduler and switches back to the primary stream after an exponentially increasing wait time has elapsed and the primary stream meets the predetermined criteria.

19 Claims, 8 Drawing Sheets

MITIGATING NETWORK IMPAIRMENTS

FIELD OF THE INVENTION

This disclosure relates in general to suppressing transport network induced impairments, and more particularly to suppressing transport network induced impairments that may cause an edge QAM device to experience instability in switching states between a primary and a secondary stream.

BACKGROUND

To deliver video, content may be packetized and sent over IP. To ensure that a multimedia network is able to reliably deliver content, spatial diversity may be utilized. For example, two streams from two different points may be injected into the network, e.g., a stream from San Diego and a stream from Atlanta may be injected into the network. Once the traffic is injected into the network, the video is processed for provisioning.

Digital cable services use quadrature amplitude modulation (QAM) modulation. An edge QAM device may carry video-on-demand (VOD) and switched digital video streams as well as Internet Protocol data and voice. Thus, an edge QAM device may be used to select the best stream for routing downstream to customers.

Spatial diversity has been a key design in video delivery mechanisms since the two paths taken by the streams may be maximally disjoint and hence the correlation in their network induced impairment orthogonal or independent. Spatial diversity has proven effective in providing reliable content delivery while attaining minimum cost.

Even though techniques such as the use of special diversity are implemented, video impairments may still occur in a video network for any number of reasons. Impairments may occur in the form of instability in the stream, quality degradation, packets being dropped, etc. For example, video impairments may be induced by either the encoder or the transport network, such that the total distortion at the decoder is the sum of both distortions of the encoder and the network. In other words, $D_{dec}=D_{enc}+D_{PLR}$, wherein $D_{dec}$ is the distortion of the decoder, $D_{enc}$ is the distortion of the encoder and $D_{pir}$ is the distortion due to network in term of packet loss rate. To meet strict quality of experience requirements for broadcast video over IP, the packet loss rate must be lower bounded by $1 \times 10^{-6}$ packet loss. Networks may be designed with the appropriate quality of service (QoS) and MPLS-based protection. However, the impact of packet loss in the transport network has a multiplicative affect at the encoder due to error propagation from reference frame into dependent frame. In other words, $P_{frame\_loss}=k \times D_{PLR}$, such that $P(F|I)=1-(1-p)^{SI}$, where p is the probability of packet loss and SI is the number of IP packets per I frame assuming that no application layer forward error correction (FEC) and no error concealment at the decoder. Also the probability of decoding error due to a P frame corruption is $$P(\overline{F} \mid P) = \frac{1}{N_P}\left(\sum_{k=1}^{N_P} 1 - (1-p)^{SI+kSp}\right),$$

where Sp is the number of P packets that constitute to a P frame and Np is the number of P frames in a group of pictures (GoP).

For example, Stream A may be the preferred video stream. Stream A may have direct connectivity with the video, e.g., HBO, ESPN, etc. Expensive encoders and decoders may be used on the direct Stream A, thereby avoiding the need to apply too much compression on Stream A. Thus, the quality of the video feed of Stream A is much better than a satellite feed. When the edge QAM device receives the two streams and an event occurs that triggers a switch to Stream B, the provider thereafter maintains the Stream B feed no matter what else happens until somebody is sent to reset it. Thus, to switch back to Stream A, service personnel have to travel to the access point and physically reset it.

Alternatively, the switch may be made, but without any knowledge about the impairments that triggered the switch in the first place. Once Stream A meets predetermined criteria, the edge QAM switches back to Stream A. Still, Stream A may quickly trigger another switch to Stream B. This may occur multiple times resulting in a ping-pong or rapidly switching back and forth between Stream A and Stream B. Dropping an occasional packet does not present a problem because most transmissions use the transmission control protocol (TCP), which probably allows recovery of the dropped packet. In contrast, with video over IP, a lost packet is truly lost when a packet is dropped and quality is dependent on the encoding mechanism and how many packets can be lost without significant degradation.

It can be seen that there is a need for method, apparatus and program storage device for mitigating network impairments on video quality.

SUMMARY OF THE INVENTION

To overcome the limitations in the prior art described above, and to overcome other limitations that will become apparent upon reading and understanding the present specification, a method, apparatus and program storage device for mitigating network impairments on video quality are disclosed.

The above-described problems are solved by suppressing transport network induced impairments that may cause an edge QAM to experience instability in switching states between a primary and a secondary stream.

An edge device for controlling provisioning of data streams to a network includes a primary channel for receiving a primary stream, a secondary channel for receiving a secondary stream, a scheduler, coupled to the primary and secondary channels, for selecting between the primary stream and the secondary stream and timers, coupled to the scheduler, for quantifying an elapsed time between a triggering event and a previous switch by the scheduler from the secondary stream to the primary stream and for quantifying a wait time. When the primary stream does not meet the predetermined criteria and the secondary stream does meet the predetermined criteria, the scheduler switches to the secondary stream and switches back to the primary stream after an exponentially increasing wait time has elapsed and the primary stream meets the predetermined criteria.

A computer readable medium includes executable instructions which, when executed by a processor, suppresses transport network induced impairments causing a edge device to experience instability in switching states by receiving a primary stream and a secondary stream, feeding the primary stream over a network, analyzing a quality of the primary stream and the secondary stream, determining whether the primary streams and secondary stream meet predetermined criteria, switching to the secondary stream when the primary stream does not meet the predetermined criteria and the secondary stream does meet the predetermined criteria and switching back to the primary stream after an exponentially increasing wait time has elapsed and the primary stream meets the predetermined criteria.

A method for mitigating network impairments on data quality includes receiving a primary stream and a secondary stream, feeding the primary stream over a network, analyzing a quality of the primary stream and the secondary stream, determining whether the primary streams and secondary stream meet predetermined criteria, switching to the secondary stream when the primary stream does not meet the predetermined criteria and the secondary stream does meet the predetermined criteria and switching back to the primary stream after an exponentially increasing wait time has elapsed and the primary stream meets the predetermined criteria.

In another embodiment, an edge device for controlling provisioning of data streams to a network includes a data communication medium for receiving a primary stream and a secondary stream, a scheduler, coupled to the data communications medium, for selecting between allowing transmission of the primary stream and the secondary stream and timers, coupled to the scheduler, for quantifying an elapsed time between a collision between the primary stream and the secondary stream and a previous switch by the scheduler from transmitting the secondary stream to transmitting the primary stream and for quantifying a wait time. The scheduler switches to transmitting only the secondary stream after detecting a collision between the primary stream and the secondary stream and switches back to transmitting the primary stream after an exponentially increasing wait time has elapsed.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

A method, apparatus and program storage device for mitigating network impairments on video quality are disclosed herein below. The above-described problems are solved by suppressing transport network induced impairments that may cause an edge QAM to experience instability in switching states between a primary and a secondary stream.

Figure 1:
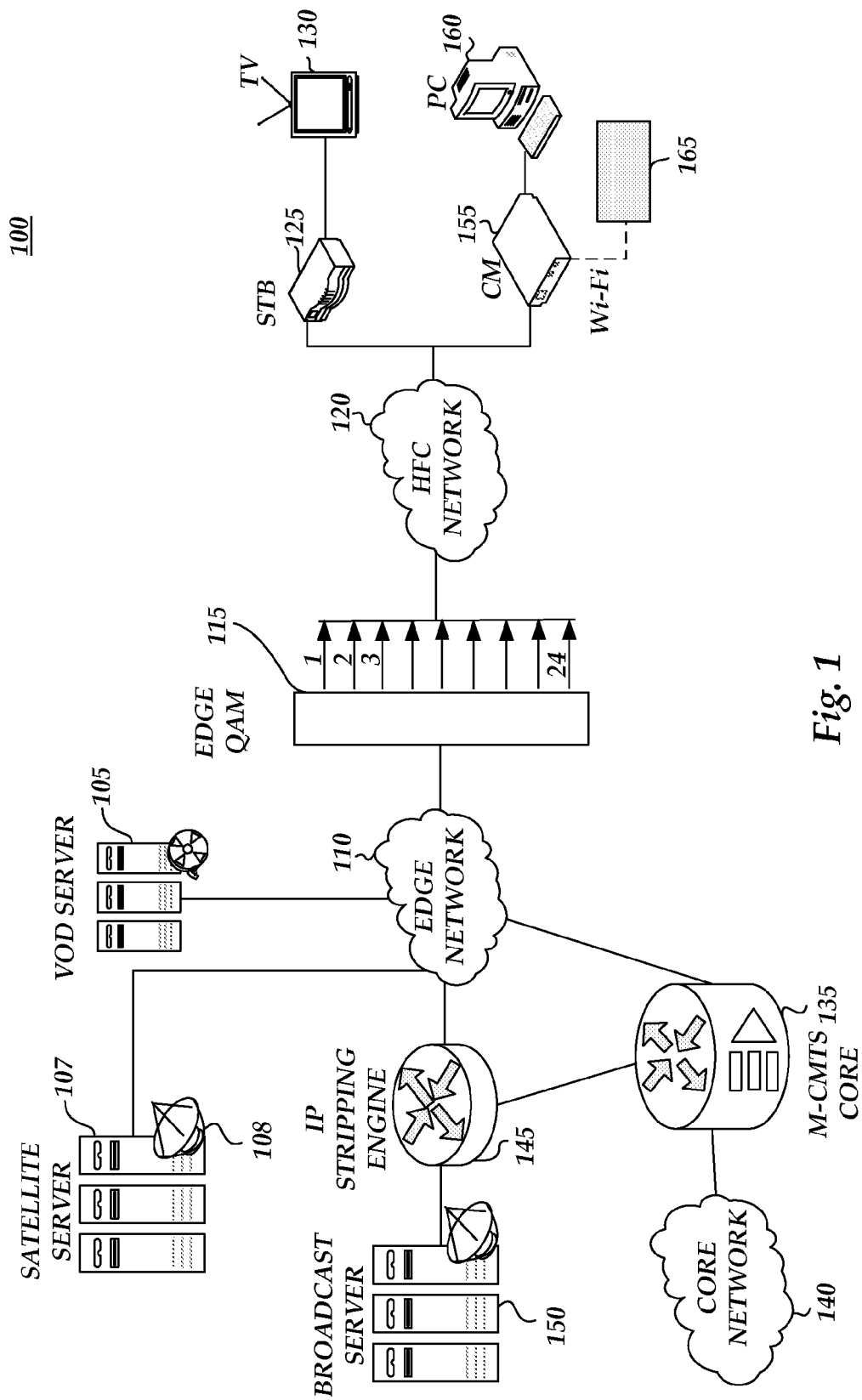
FIG. 1 illustrates system in which the features and principles of the present invention may be implemented.

FIG. 1 illustrates system 100 in which the features and principles of the present invention may be implemented. As illustrated in the block diagram of FIG. 1, system 100 may include video-on-demand (VOD) server 105, an edge network 110, an edge QAM device 115, a hybrid fiber/coax (HFC) network 120, a set-top box (STB) 125, a television (TV) 130, a modular cable modem terminal service (M-CMTS) core 135, a core network 140, an IP stripping engine 145, a broadcast server 150, a satellite server 107, a satellite antenna 108, a cable modem (CM) 155, a personal computer (PC) 160, and a portable device 165 using wireless fidelity (Wi-Fi), for example.

System 100 may generate packets that can then be received by edge QAM device 115. The sources shown in FIG. 1 (e.g., VOD server 105, broadcast server 150, satellite server 107) may be capable of spreading their content across multiple QAM channels.

VOD server 105 may take compressed video off of a hard disk, format it into packets for transmission over the edge network 110. The packets may be received by edge QAM device 115, where the packets are forwarded down one QAM channel onto HFC network 120. HFC network 120 may comprise a communications network (e.g. a cable TV network) that uses a combination of optical fibers and coaxial cable. The fiber may provide the high-speed backbone and the coax may be used to connect end users to the backbone. Such networks typically use, for example, cable modems at the head end and at the customer premises, providing bidirectional paths and Internet access. The packets may be received by STB 125 where the video may be removed, decompressed, and sent to TV 130.

IP striping engine 145 may take a large number of high bandwidth video channels from broadcast server 150. These video channels, for example, may be sent to IP striping engine 145 using IP multicast. IP striping engine 145 may take the IP multicast packets and map them into packets for distribution across a number of virtual QAM channel queues, wherein they are further processed and sent to each QAM channel within the edge QAM device 115. Edge QAM device 115 may schedule (i.e. multiplex) the packets from each of these sources onto the QAM Channels. STB 125 may extract the video from the packets and send the video stream to TV 130.

Satellite server 107 receives data from a satellite source via satellite antenna 108. Satellite server 107 includes data processing devices for converting the format of the data received from satellite antenna 108 from a format designed for satellite transmission to an IP format. The packets from satellite server 107 may then be received by edge QAM device 115, where the packets are forwarded down a QAM channel onto HFC network 120.

Figure 2:
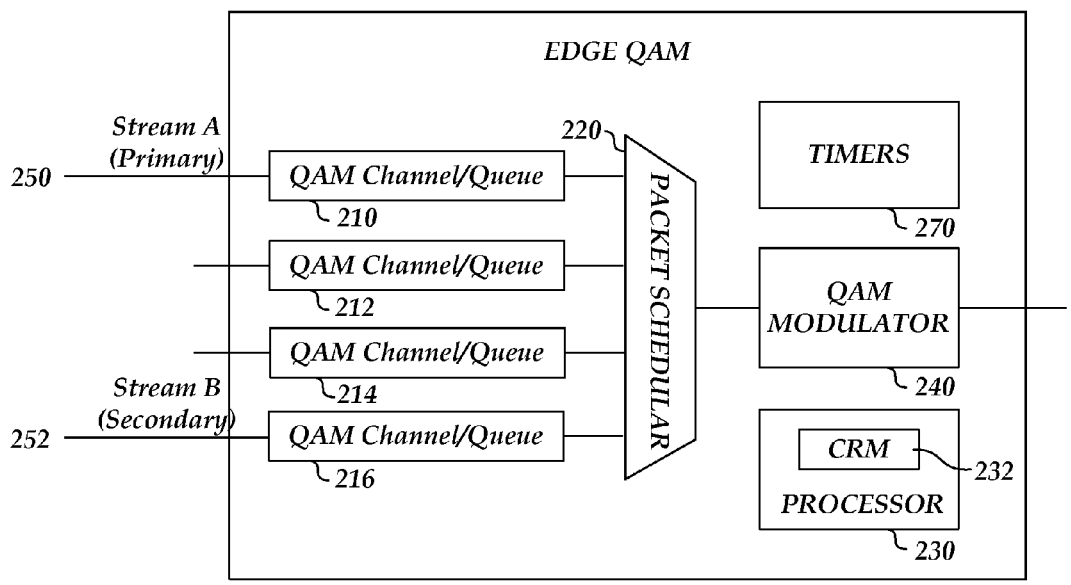
FIG. 2 illustrates a block diagram of an edge QAM device according to an embodiment of the present invention.

FIG. 2 illustrates a block diagram of an edge QAM 200 according to an embodiment of the present invention. In FIG. 2, edge QAM 200 includes a plurality of QAM channels or queues 210-216. The QAM channels 210-216 are coupled to a packet scheduler 220. The packet scheduler 220 is controlled by processor 230. The output of the packet scheduler 220 may be coupled to a QAM modulator 240. The processor 230 may be configured to mitigate network impairments on video quality provided via QAM channels 210-216. For example, a primary stream 250 may be received at channel 210. Channel 216 may receive a secondary stream 252. Video impairments may occur in a video network due to instability in the stream, quality degradation, packets being dropped, etc. More specifically, video impairments may be induced by the encoder or the transport network, such that the total distortion at the decoder is the sum of both distortions of the encoder and the network. However, the quality of the video feed of the primary stream 250 may be much better than the secondary stream 252.

When the edge QAM 200 receives the two streams, an event may occur that triggers a switch to the secondary stream 252. Once the primary stream 250 meets predetermined criteria, the edge QAM 200 may switch back to the primary stream 250. However, without further control, the edge QAM 200 may switch back and forth rapidly resulting in instability of switching states between a primary stream 250 and a secondary stream 252. Thus, timers 270, or timer throttles, are used to control the switching from Stream A 250 and Stream B 252. Video engineers may log onto the edge QAM 200. At a command line, the video engineers may configure the parameters, including the timers, the maximum wait time, etc. Periodic reviews enable the engineers to verify the accuracy and/or efficiency of the parameters that have been loaded. The operation of the timers 270 for suppressing transport network induced impairments that may cause an edge QAM device 200 to experience instability in switching states between a primary and a secondary stream will be described in greater detail herein below.

While embodiments of the invention will be described in the general context of program modules that execute in conjunction with other program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that embodiments of the invention may be practiced with other computer system configurations, multiprocessor systems, microprocessor-based or programmable electronics, mini-computers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 2, processor 230 includes computer-readable memory 232, which may include a random access memory ("RAM") and a read-only memory ("ROM"), etc. The description of computer-readable media contained herein will be understood to refer to a mass storage device, such as a hard disk or CD-ROM drive, or any available media that can be accessed or utilized by the computer.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by processor 230. According to various embodiments of the invention, processor 230 may operate in a networked environment using logical connections to remote computers through a network. The processor 230 may also interface with an input/output controller for receiving and processing input from a number of other devices, including a keyboard, mouse, etc. (not shown) and provide output to a display screen, a printer, or other type of output device (also not shown).

Processor 230, as illustrated in FIG. 2, may be configured to execute instructions for suppressing transport network induced impairments that may cause an edge QAM device to experience instability in switching states between a primary and a secondary stream according to embodiments of the present invention as described herein. It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Figure 3:
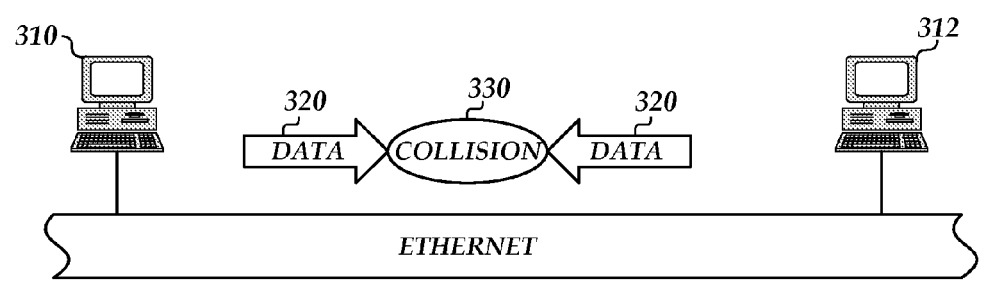
FIG. 3 shows an Ethernet network according to an embodiment of the present invention.

FIG. 3 shows an Ethernet network 300 according to an embodiment of the present invention. In FIG. 3, two network devices 310, 312 are coupled by an Ethernet channel. Data is being passed between network devices 310, 312. Ethernet uses a scheme referred to as the carrier sense multiple access with collision detection (CSMA/CD) protocol to control how network devices share the channel. The CSMA/DA protocol involves a main procedure and a collision detected procedure. According to the main procedure, a network device that has a frame ready for transmission, determines whether the medium, i.e., Ethernet channel, is idle. If not, the network device waits until it becomes ready and waits for a predetermined time, which is referred to as the interframe gap period. Thereafter, the network device begins transmitting data frames 320. If a collision 330 occurs because another network device tries to transmit data on the Ethernet channel at the same time, the network device switches to a collision detected procedure and the retransmission counters and end frame transmission are reset.

According to the collision detected procedure, transmission is continued until a minimum packet time is reached (jam signal) to ensure that all receivers detect the collision 330. Then, the retransmission counter is incremented. A determination is made whether the maximum number of transmission attempts has been reached by the network device. If so, the network device aborts transmission of its data. The network device then calculates a random backoff period based on the number of this collision and re-enters the main procedure at the beginning.

Nevertheless, video quality may be degraded because of lost or delayed packets. Ethernet requires retransmission of dropped or lost packets, or induces delays due to queuing of the data. Thus, in contrast to video networks having a plurality of video sources, Ethernet involves only a single stream. Yet, the timer control provided according to an embodiment of the present invention is also useful for improving video quality provided over Ethernet channels.

Figure 4:
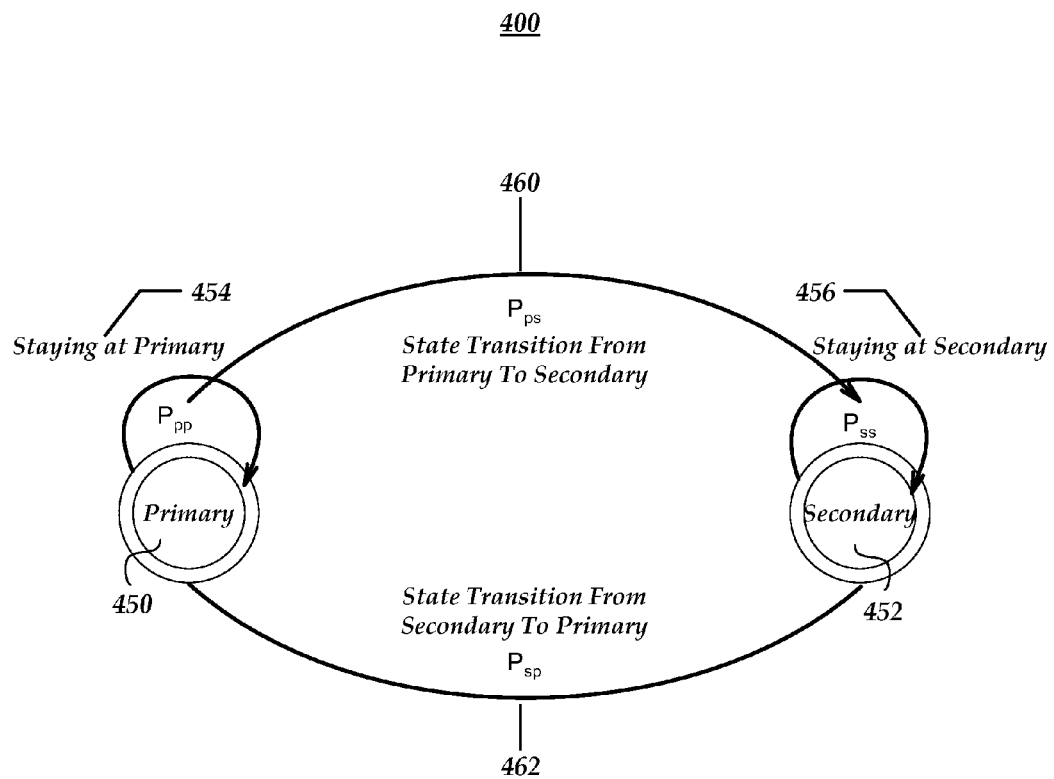
FIG. 4 illustrates a state diagram for suppressing transport network induced impairments due to instability in switching states between a primary and a secondary stream according to an embodiment of the present invention.

FIG. 4 illustrates a state diagram 400 for suppressing transport network induced impairments due to instability in switching states between a primary and a secondary stream according to an embodiment of the present invention. The state diagram 400 will also be discussed with reference to the edge QAM 200 of FIG. 2. However, those skilled in the art will recognize that the present invention is not meant to be limited by the edge QAM 200 illustrated in FIG. 2.

Referring to FIG. 2, Stream A 250, in this example, is the primary stream and is received on QAM channel 210 and Stream B 252 is received on QAM channel 216. Stream A 250 is the preferred stream because Stream A has better connectivity to the video and less compression is used. In FIG. 4, the primary stream 450 and secondary stream 452 correspond to packet scheduler switch states for Stream A 250 and Stream B 252. State $P_{pp}$ 454 represents a state wherein the packet scheduler maintains provisioning of the primary stream 450.

As the quality of Stream A 250 degrades, a switch is made by the packet scheduler to Stream B 252. In FIG. 4, the switching is shown as a state transition 460 from primary 450 to secondary 452. The state transition from primary 450 to secondary 452 is represented by $P_{ps}$. State $P_{ss}$ 456 represents a state wherein the packet scheduler maintains provisioning of the secondary stream 452.

After switching to Stream B 252, Stream A 250 improves to meet required quality of service. Thus, the health status of Stream A 250 is updated. Once Stream A becomes healthy and a predetermined time has passed, e.g., 10 seconds, a switch is made back to Stream A 250. The state transition 462 from secondary 452 to primary 450 is represented by $P_{sp}$. The secondary to primary hold variable, i.e., $P_{sp}$hold, is set somewhere between P(ps) first, e.g., 10 seconds, and P(sp) max, e.g., 1800 seconds. The edge QAM may hold the switch for the maximum time interval and until the quality of the service is met. W(t) is the time to wait before transitioning from secondary stream to primary stream. This transitioning may be implemented for either MPTS or SPTS. MPTS is a multi-program transport stream, whereas SPTS is a single program transport stream. MPTS may be thought of as multiple channels transported together, e.g., HBO and ESPN are transported together. SPTS applies to single programs and may be thought of as a single channel on which a program is transported. The amount of time elapsed since previous $i^{th}$ transition is $u_i(t)$.

Once a switch to Stream B 252 is made, the wait time, W(t), is initiated. After that, the variable, $u_i(t)$ is read to determine how much time has elapsed since the switch to Stream B 252 was made. Again, those skilled in the art will recognize that embodiments of the present invention assume a switch is not made unless the target is healthy or otherwise meets predetermined performance criteria. Thus, every time a state transition occurs, the W(t) variable is updated to make it two times the previous value. If $u_i(t)$, i.e., the time elapsed since the last transition, is less than W(t), the edge QAM does not switch. The W(t) variable must first expire. The wait time will continue to increase exponentially until the maximum value, P(sp) max, is reached.

After switching back to the Stream A 250, another triggering event may occur, and a switch is again made to Stream B 252. However, this time, the state transition 462 from secondary 452 to primary 450 is delayed until 20 seconds has elapsed. Thus, the switch time is backed off by doubling the previous time period. However, those skilled in the art will recognize that embodiments of the present invention are not meant to be limited to the timer values described above. Rather, the embodiments of the present invention may be implemented with any formula that provides a backoff of the switching time. Still further, after switching again to Stream A 250 after waiting for the 20 seconds to elapse, and then a new triggering event occurs, a switch is once again made to Stream B 252. The switch time is further extended, e.g., to 40 seconds. This lengthening of the switching time allows the network to hide or mitigate the impairment of network data.

Because the edge QAM maintains a record of the states $P_{pp}$, $P_{ps}$, $P_{ss}$, $P_{sp}$ of Stream A 250 and Stream B 252, the backoff process provides a robust solution that is automatic and that prevents the ping-pong effect. The decisions on the states $P_{pp}$, $P_{ps}$, $P_{ss}$, $P_{sp}$ of Stream A 250 and Stream B 252 may be based on service level metrics or the quality of the experience including parameters such as signature ratio, number of packets dropped, etc. In addition, the embodiments of the present invention may also be based on collisions between signals in a network, such as with an Ethernet network, rather than a comparison between states of two signals.

Control of state switching as described herein mitigates the transport network instabilities that may result in rapid switch states between primary and secondary streams due to lower layer errors that are caused at the transport layer. These lower level errors will result in a backbone link that is carrying broadcast video to switch between periods of packet loss and periods with no packet loss over a very short time interval. Lower layer errors may be classified, for example, as errors in a SONET header such as K1/K2/K3 that the IP layer and hence its quality of service can not protect. Also, link flapping due to transport network errors may occur at a very high rate, and can not be detected in a timely fashion thereby resulting in packet drop. Based on MPTS of 37.8 Mbps and for MPEG-2 SD, 4 packets may be lost in 1 ms. The property of time-varying link loss that the IP layer is not immune from is mitigated by the switching control provided by the switch timers described herein. Thus, the edge QAM will select the primary stream 450 as long as the errors per second is below a value "X" averaged over the interval "t", and the QAM will switch to the secondary stream as soon as the above rule is violated. The QAM will stay in the secondary feed and will measure the quality of the primary feed.

Figure 5:
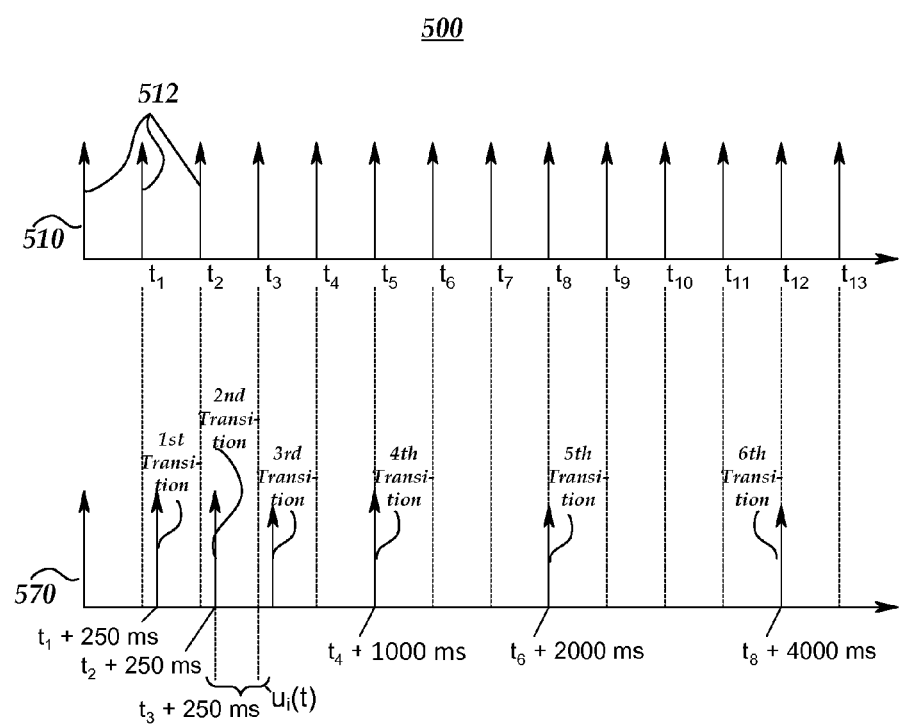
FIG. 5 is a diagram of two plots superimposed showing likely intervals between events that impact data streams and the transitions according to an embodiment of the present invention.

FIG. 5 is a diagram 500 of two plots superimposed. The top plot 510 shows likely intervals between events 512 that impact data streams. In FIG. 5, an interval of 1000 ms between t(i) is shown in the top plot 510. The lower plot 570 shows how the transitions may be implemented. Every time a transition occurs, the wait time is doubled. As can be seen, the first transition occurs at $t_1$+250 ms, the second transition occurs at $t_2$+250 ms and the third transition occurs at $t_3$+250 ms. The fourth transition occurs at $t_4$+1000 ms. Then, the fifth transition occurs at $t_5$+2000 ms. The sixth transition occurs at $t_6$+4000 ms. A more detailed explanation for the transitions and the timing of switch states is provided with reference to FIGS. 6a-f below.

Figure 6A:
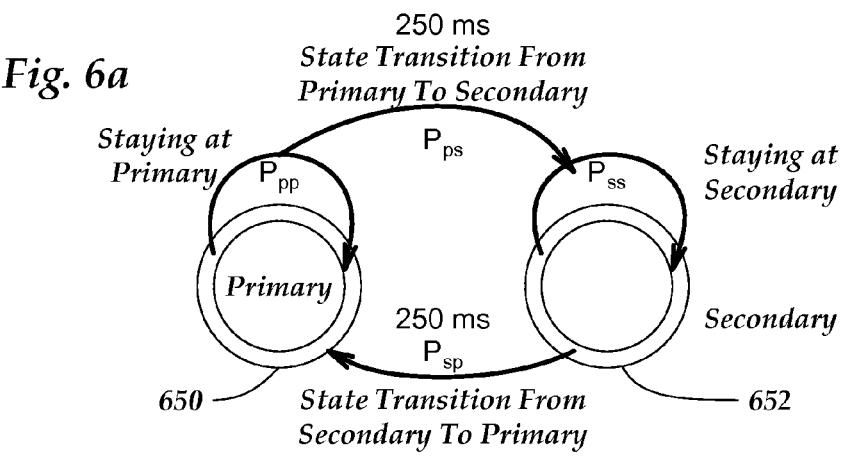
FIG. 6a-f illustrates the state transition diagrams for the events shown in FIG. 5.

FIGS. 6a-f illustrates the state transition diagrams for the events shown in FIG. 5. In FIG. 6a, the first transition from the secondary stream to the primary stream is scheduled to run at $t_1$+250 ms, wherein $t_1$, is the time the first event occurred to cause a switch from the primary stream to the secondary stream. The wait time, $W_1(t)$ is set at 250 ms. As can be seen in FIG. 6a, a switch from primary 650 to secondary 652 occurs at the first triggering event and a switch from secondary 652 to primary 650 occurs 250 ms later, assuming the primary stream is error free.

Figure 6B:
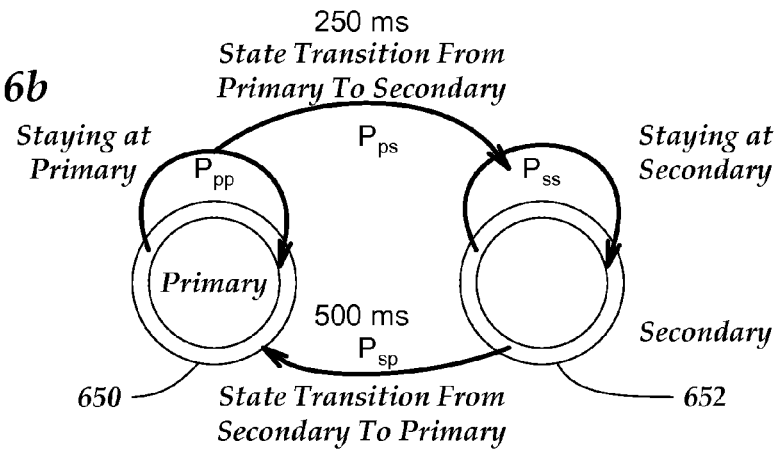

In FIG. 6b, the time elapsed between the occurrence of the second event and the previous transition from the secondary stream 652 to the primary stream 650, $u_2(t)$ is 750 ms and the wait time is 250 ms. If the time elapsed, $u_2(t)$, is greater than or equal to the wait time, $W_1(t)$, a switch from primary 650 to secondary 652 occurs at the next triggering event and a switch from secondary 652 to primary 650 occurs 250 ms later, assuming the primary stream is error free. The wait time, $W_2(t)$, is doubled to 500 ms.

Figure 6C:
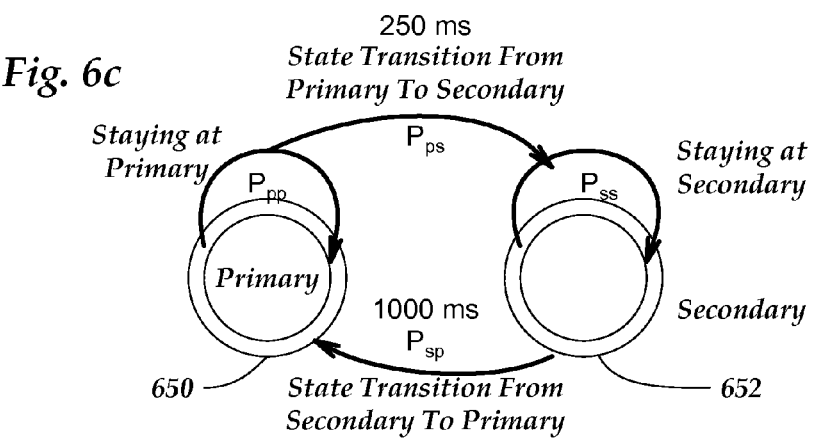

In FIG. 6c, the time elapsed between the occurrence of the third event and the previous transition from the secondary stream 652 to the primary stream 650, $u_3(t)$ is 750 ms. The wait time is now 500 ms. If the time elapsed, $u_3(t)$, is greater than or equal to the wait time, $W_2(t)$, a switch from primary 650 to secondary 652 occurs at the next triggering event and a switch from secondary 652 to primary 650 occurs 250 ms later, assuming the primary stream is error free. The wait time, $W_3(t)$, is doubled to 1000 ms.

Figure 6D:
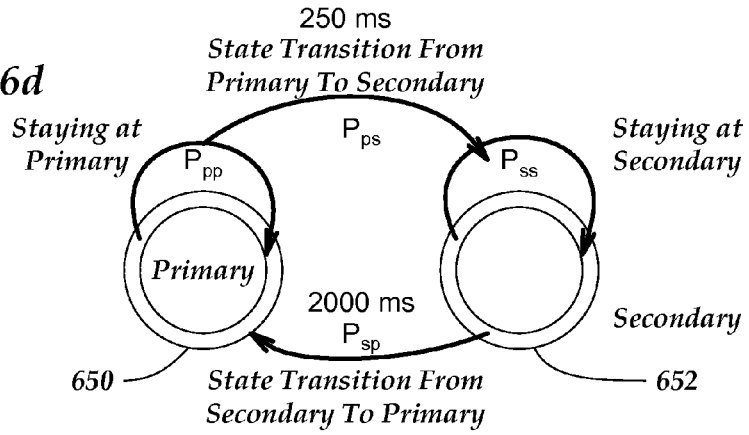

In FIG. 6d, the time elapsed between the occurrence of the fourth event and the previous transition from the secondary stream 652 to the primary stream 650, $u_3(t)$ is 750 ms. The wait time is now 1000 ms. The time elapsed, $u_4(t)$, is less than the wait time, $W_3(t)$. A switch from primary 650 to secondary 652 occurs at the next triggering event and a switch from secondary 652 to primary 650 occurs 1000 ms later, i.e., after the wait time, $W_3(t)$, assuming the primary stream is error free. The wait time, $W_4(t)$, is doubled to 2000 ms.

Figure 6E:
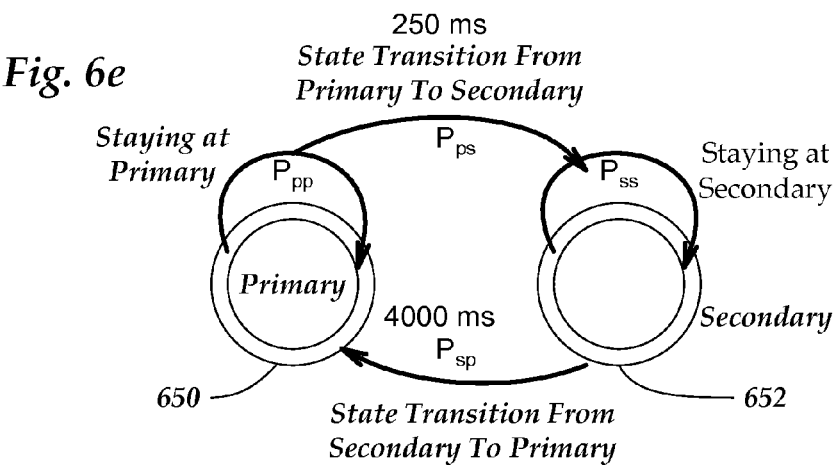

In FIG. 6e, the time elapsed between the occurrence of the sixth event and the previous transition from the secondary stream 652 to the primary stream 650, $u_6(t)$ is 1000 ms. Now, the wait time is 2000 ms. The time elapsed, $u_7(t)$, is less than the wait time, $W_4(t)$. A switch from primary 650 to secondary 652 occurs at the next triggering event and a switch from secondary 652 to primary 650 occurs 2000 ms later, i.e., after the wait time, $W_4(t)$, assuming the primary stream is error free. The wait time, $W_5(t)$, is doubled to 4000 ms.

Figure 6F:
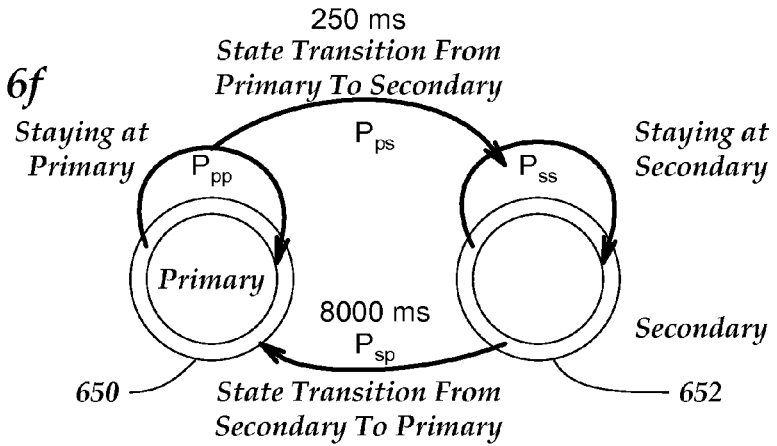

In FIG. 6f, the time elapsed between the occurrence of the ninth event and the previous transition from the secondary stream 652 to the primary stream 650, $u_8(t)$ is 1000 ms. The wait time is 4000 ms. The time elapsed, $u_8(t)$, is less than the wait time, $W_6(t)$. A switch from primary 650 to secondary 652 occurs at the next triggering event and a switch from secondary 652 to primary 650 occurs 4000 ms later, i.e., after the wait time, $W_4(t)$, assuming the primary stream is error free. The wait time, $W_8(t)$, is doubled to 8000 ms. The waiting time of 8000 ms will continue to be enforced until the quite period extends for 8000 ms. After that, the waiting time will be reset to P(sp) hold of 250 ms.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for mitigating network impairments on data quality, comprising:
   receiving a primary stream at a first input of an edge device while receiving a secondary stream at a second input of the edge device;
   feeding the primary stream to an output of the edge device for transmission over a network;
   analyzing a quality of the primary stream and the secondary stream received at the input of the edge device;
   determining whether the primary streams and secondary stream meet predetermined criteria;
   switching to feed the secondary stream to the output of the edge device when the primary stream does not meet the predetermined criteria and the secondary stream does meet the predetermined criteria;
   setting a wait time for switching back to feed the primary stream to the output of the edge device after the switching from feeding the primary stream to feeding the secondary stream, wherein the wait time is equal to a predetermined time, tn, plus an exponentially increasing variable, Ex, wherein the exponentially increasing variable, Ex is initially zero and exponentially increases with each transition from feeding the secondary stream to feeding the primary stream;
   determining an amount of time elapsed since switching to feed the secondary stream to the output of the edge device; and
   switching to feed the primary stream to the output of the edge device when the primary stream meets the predetermined criteria and when the determined amount of time elapsed since switching to feed the secondary stream to the output of the edge device is greater than the set wait time.

2. The method of claim 1, wherein the switching back to feed the primary stream to the output of the edge device further comprises doubling the wait time after each switch from feeding the primary stream to the output of the edge device to feeding the secondary stream to the output of the edge device.

3. The method of claim 1, wherein the switching back to feed the primary stream to the output of the edge device further comprises, when the wait time is less than or equal to a primary to secondary hold time, delaying the switch to feed the primary stream to the output of the edge device for the primary to secondary hold time after an occurrence of a triggering event.

4. The method of claim 1, wherein the switching back to feed the primary stream to the output of the edge device further comprises, when the wait time is greater than a primary to secondary hold time, delaying the switch to feed the primary stream to the output of the edge device for the wait time after an occurrence of a triggering event.

5. The method of claim 1, wherein the switching back to feed the primary stream to the output of the edge device further comprises delaying the switch to feed the primary stream to the output of the edge device until the greater of the wait time or a primary to secondary hold time has elapsed after an occurrence of a triggering event.

6. The method of claim 1 further comprises setting the wait time to a maximum amount of time, waiting until the primary stream meets the predetermined criteria for the maximum amount of time and resetting the wait time to a primary to secondary hold time.

7. An edge device for controlling provisioning of data streams to a network, comprising:
   a primary channel at an input of an edge device for receiving a primary stream;
   a secondary channel at the input of the edge device for receiving a secondary stream contemporaneously with receipt of the primary channel at the primary channel;
   a scheduler, coupled to the primary and secondary channels, for selecting between feeding the primary stream and the secondary stream to an output of the edge device for transmission; and
   timers, coupled to the scheduler, for quantifying an elapsed time between a triggering event and a previous switch by the scheduler from feeding the secondary stream to the output of the edge device to feeding the primary stream to the output of the edge device and for quantifying a wait time;

wherein, when the primary stream does not meet the predetermined criteria and the secondary stream does meet the predetermined criteria, the scheduler switches to feeding the secondary stream to the output of the edge device sets a wait time for switching back to feed the primary stream to the output of the edge device after the switching from feeding the primary stream to feeding the secondary stream, wherein the wait time is equal to a predetermined time, $t_n$, plus an exponentially increasing variable, $E_x$, wherein the exponentially increasing variable $E_x$, is initially zero and exponentially increases with each transition from feeding the secondary stream to feeding the primary stream, determines an amount of time elapsed since switching to feed the secondary stream to the output of the edge device; and switches to feed the primary stream to the output of the edge device.

8. The edge device of claim 7, wherein the scheduler selects between feeding the primary stream and the secondary stream to the output of the edge device based on an analysis of the quality of the primary stream and the secondary stream.

9. The edge device of claim 7, wherein the scheduler doubles the wait time after each switch from feeding the primary stream to the output of the edge device to feeding the secondary stream to the output of the edge device.

10. The edge device of claim 7, wherein the scheduler delays the switch to feeding the primary stream to the output of the edge device for the primary to secondary hold time after an occurrence of a triggering event when the wait time is less than or equal to a primary to secondary hold time.

11. The edge device of claim 7, wherein the scheduler delays the switch to feeding the primary stream to the output of the edge device for the wait time after an occurrence of a triggering event when the wait time is greater than a primary to secondary hold time.

12. The edge device of claim 7, wherein the scheduler delays the switch to feeding the primary stream to the output of the edge device until the greater of the wait time or a primary to secondary hold time has elapsed after an occurrence of a triggering event.

13. The edge device of claim 7, wherein the scheduler sets the wait time to a maximum amount of time after a predetermined number of switches from feeding the primary stream to the output of the edge device to feeding the secondary stream to the output of the edge device, waits until the primary stream meets the predetermined criteria for the maximum amount of time and resets the wait time to a primary to secondary hold time.

14. A non-transitory computer readable medium including executable instructions which, when executed by a processor, suppresses transport network induced impairments causing an edge device to experience instability in switching states, by:

receiving a primary stream at a first input of an edge device while receiving a secondary stream at a second input of the edge device;

feeding the primary stream to an output of the edge device for transmission over a network;

analyzing a quality of the primary stream and the secondary stream received at the input of the edge device;

determining whether the primary streams and secondary stream meet predetermined criteria;

switching to feed the secondary stream to the output of the edge device when the primary stream does not meet the predetermined criteria and the secondary stream does meet the predetermined criteria;

setting a wait time for switching back to feed the primary stream to the output of the edge device after the switching from feeding the primary stream to feeding the secondary stream, wherein the wait time is equal to a predetermined time, tn, plus an exponentially increasing variable, Ex, wherein the exponentially increasing variable, Ex is initially zero and exponentially increases with each transition from feeding the secondary stream to feeding the primary stream;

determining an amount of time elapsed since switching to feed the secondary stream to the output of the edge device; and switching to feed the primary stream to the output of the edge device when the primary stream meets the predetermined criteria and when the determined amount of time elapsed since switching to feed the secondary stream to the output of the edge device is greater than the set wait time.

15. The computer readable medium of claim 14, wherein the switching back to feed the primary stream to the output of the edge device further comprises doubling the wait time after each switch from feeding the primary stream to the output of the edge device to feeding the secondary stream to the output of the edge device.

16. The computer readable medium of claim 14, wherein the switching back to feed the primary stream to the output of the edge device further comprises, when the wait time is less than or equal to a primary to secondary hold time, delaying the switch to feed the primary stream to the output of the edge device for the primary to secondary hold time after an occurrence of a triggering event.

17. The computer readable medium of claim 14, wherein the switching back to feed the primary stream to the output of the edge device further comprises, when the wait time is greater than a primary to secondary hold time, delaying the switch to feed the primary stream to the output of the edge device for the wait time after an occurrence of a triggering event.

18. The computer readable medium of claim 14, wherein the switching back to feed the primary stream to the output of the edge device further comprises delaying the switch to feed the primary stream to the output of the edge device until the greater of the wait time or a primary to secondary hold time has elapsed after an occurrence of a triggering event.

19. The computer readable medium of claim 14, further comprises setting the wait time to a maximum amount of time, waiting until the primary stream meets the predetermined criteria for the maximum amount of time and resetting the wait time to a primary to secondary hold time.

* * * * *